United States Patent [19]

Nishi et al.

[11] Patent Number: 4,540,247
[45] Date of Patent: Sep. 10, 1985

[54] HOLOGRAM SCANNER

[75] Inventors: Kazuro Nishi; Koichiro Kurahashi; Tsutomu Hashimoto; Toshihiko Senoo; Shinji Yamato, all of Hyogo, Japan

[73] Assignee: Mitsubishi Denki Kabushiki Kaisha, Japan

[21] Appl. No.: 390,569

[22] Filed: Jun. 21, 1982

[30] Foreign Application Priority Data

Jun. 26, 1981 [JP] Japan .................. 56-100160

[51] Int. Cl.³ .............................................. G42B 5/32
[52] U.S. Cl. ........................................ 350/3.71; 350/6.2
[58] Field of Search ................. 350/3.71, 6.1, 6.2, 350/6.3

[56] References Cited

U.S. PATENT DOCUMENTS 3,619,033  11/1971  McMahon ................. 350/3.71
4,165,464   8/1979  Ikeda et al. ............... 350/3.71

Primary Examiner—John K. Corbin
Assistant Examiner—William Propp
Attorney, Agent, or Firm—Sughrue, Mion, Zinn, Macpeak and Seas

[57] ABSTRACT

A hologram scanner includes a rotatable hologram disk on which a plurality of hologram lenses are arranged circumferentially, and a light beam guide mechanism for successively shifting irradiation regions in a predetermined direction with respect to the direction of rotation of the hologram disk, to apply a light beam successively to the hologram lenses on the hologram disk, so that the scanning of a reading window with the light beam is effected in all directions with high density. The hologram scanner is employable as a bar code reading device in a POS or UPC system.

10 Claims, 7 Drawing Figures

HOLOGRAM SCANNER

BACKGROUND OF THE INVENTION

1. Technical Field

This invention relates to a hologram scanner which is employed to read bar codes in a POS or UPC system or the like.

2. Description of the Prior Art

A conventional hologram scanner of this type is as shown in FIG. 1. In FIG. 1, reference numeral 1 designates a laser oscillator; 2, a light beam; 3, a lens; 4 a mirror; 5, a mirror having a hole 5a through which the light beam 2 advances; 6, hologram lenses for deflecting the light beam 2; 7, a hologram disk containing the hologram lenses 6, the centers of which are displaced in correspondence to the pitch of a scanning line, and the number of which is equal to the number of scanning lines; and 8 and 9, first and second scanning beams which are diffracted to spatially separated positions, respectively. Further in FIG. 1, reference numerals 10 and 11 designate mirrors for reflecting the scanning beams 8 and 9, respectively; 12, a reading window; 13 and 14, scanning lines provided by the scanning beams 8 and 9, respectively; 15, a light beam scattered by a bar code on a label which is placed on the reading window; 16, a photo-detector; and 17, a motor for rotating the hologram disk 7.

In operation, the light beam 2 from the laser oscillator 1 is applied through the lens 3, the mirror 4 and the hole 5a of the mirror 5 to the hologram lenses 6. As the hologram disk 7 is turned by the motor 17, the light beam 2 is deflected by the hologram lenses on the hologram disk 7, thus providing successive scanning beams. Typical of the scanning beams thus provided are the first and second scanning beams 8 and 9 mentioned above. The direction of deflection of these scanning beams is in parallel with a tangential line at the point A (which is the incident point of the light beam) of the hologram disk 7. As the centers of the hologram lenses 6 are displaced as described above, the scanning beams 8 and 9 are shifted radially of the hologram disk 7. Accordingly, parallel scanning lines, the number of which are equal to the number of hologram lenses 6 on the hologram disk 7, are generated. By increasing the amount of displacement of the centers of the hologram lenses 6, all of the scanning lines may be provided at spatially separated positions and divided into two groups. This is to facilitate the setting of the mirrors 10 and 11 to provide two scanning line directions on the reading window 12.

The scanning beam groups, which are represented by the first and second scanning beams 8 and 9, are reflected by the first and second mirrors 10 and 11 which are set at predetermined angles and at predetermined positions, to thus provide scanning lines 13 and 14, extending in two directions, over the reading window 12.

When a label is scanned according to the above-described scanning pattern, the light beam 15 scattered by the bar code on the label advances along the optical path of the light beam 2, thus being collected on the photo-detector 16. As a result, the scattered light beam 15 is converted into an electrical signal by the photo-detector 16. Thus, the bar code has been optically read.

FIG. 1 shows two scanning beams 8 and 9 extending from one hologram lens 6. However, it should be noted that, in practice, only one scanning line is obtained from one hologram lens. That is, for convenience in describing the prior art, FIG. 1 shows another hologram lens which is also brought into the optical path of the light beam 2 by rotation of the hologram disk 7.

In order to make it possible to read a bar code in all directions with high accuracy with such a hologram scanner, it is necessary to produce a scanning pattern having a number of scanning lines in many directions. In the case of reading a bar code label of small size, or a label of small height, or in the case of reading a non-moving label, the conventional hologram scanner does not have a sufficient number of scanning line directions. Thus, it is necessary for the conventional hologram scanner to increase its number of scanning line directions. When it is so required to modify the conventional hologram scanner, it is necessary to provide reflecting mirrors, the number of which is at least equal to the number of required scanning directions. This requires an intricate hologram scanner, which limits the increase in the number of scanning directions. On the other hand, if a set number of scanning lines provided by a hologram disk is used, they must be separately assigned according to the plurality of scanning directions required. This means that the number of scanning lines in each direction is decreased, and thus the number of scanning lines is insufficient.

SUMMARY OF THE INVENTION

An object of this invention is to eliminate the above-described difficulties accompanying a conventional hologram scanner.

More specifically, an object of the invention is to provide a hologram scanner in which a hologram disk and light beam guide means for successively switching light beam irradiation regions are suitably combined, to thereby make it possible to read a bar code in all directions with high accuracy.

BRIEF DESCRIPTION OF THE DRAWINGS

In FIGS. 4 and 7, for convenience of illustration, among the scanning lines in various directions, only those coincident with or adjacent to the central ones are shown.

DETAILED DESCRIPTION OF THE PREFERRED EMBODIMENTS

Figure 2:
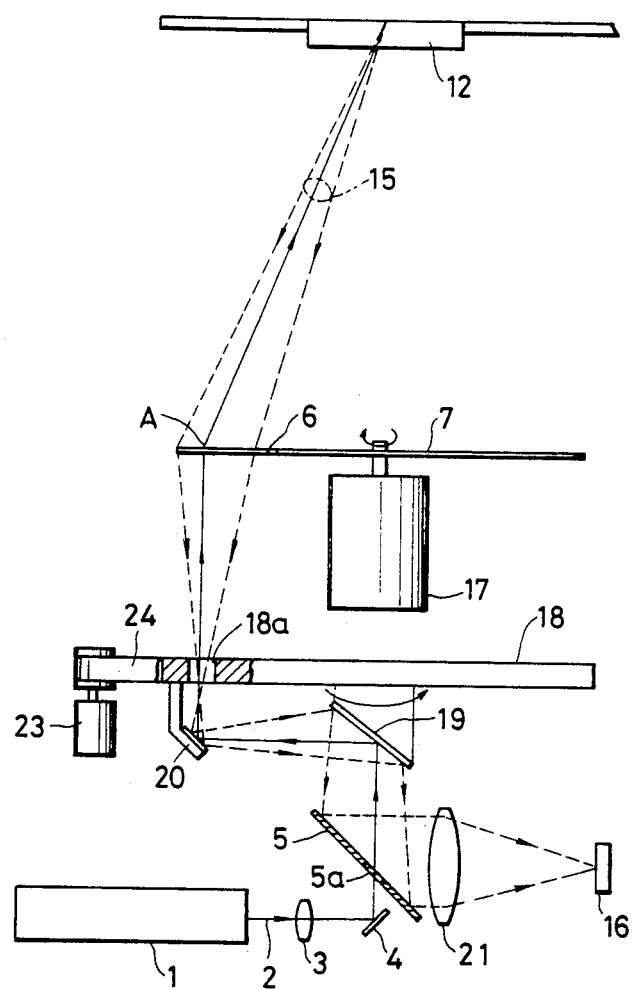
FIG. 2 is a sectional view of one example of a hologram scanner according to this invention.

FIG. 2 is a sectional view showing the arrangement of one example of a hologram scanner according to the this invention.

Figure 1:
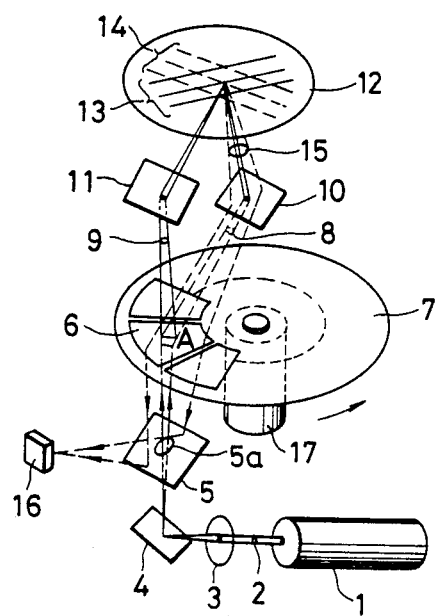
FIG. 1 is a perspective view of a conventional hologram scanner.

In FIG. 2, those components which have been previously described with reference to FIG. 1 are similarly numbered. Further in FIG. 2, reference numeral 18 designates a rotary disk having a hole 18a through which the light beam 2 can pass, and a rotary shaft coaxial with the rotary shaft of the motor 17; 19 is a first mirror which is fixedly set at the center of the rotary disk and at a predetermined angle; and 20 is a second mirror which is fixedly secure to the peripheral portion of the rotary disk 18 so that it is turned together with the first mirror 19. A condenser lens 21, a motor 22 for rotating the rotary disk 18 and a belt 24 complete the arrangement. The rotary disk 18, the first mirror 19 and the second mirror 20 form light beam guide means.

The light beam 2 from the laser oscillator 1 is applied through the lens 3 to the mirror 4. The light beam 2 thus applied is reflected by the mirror 4, and is then applied through the hole 5a of the mirror 5 to the first mirror 19. In this operation, the optical axis is coincident with the rotary axis of the rotary disk 18.

The light beam 2 reflected by the first mirror 19 is reflected by the second mirror 20, which is fixedly secured in such a manner as to turn together with the first mirror 19, as a result of which the light beam 2 thus reflected is applied to one of the hologram lenses 6 on the hologram disk 7.

The light beam is diffracted by the hologram lens 6, thus reaching the reading window 12.

The light beam 15 scattered by the bar code on a label on the reading window 12 advances along the optical path of the light beam 2 in the opposite direction to reach the mirror 5, where it is reflected. The light beam 15 thus reflected is applied through the condenser lens 21 to the photo-detector 16, where it is converted into an electrical signal.

As seen from FIG. 2, the mirror 29 and mirror 20 are fixed to the rotary disk 18 at predetermined angles such that light beam 2 passing through aperature 5a of mirror 5 is reflected from mirror 19 to mirror 20 and from mirror 20 through apearature 18a. In addition, the selected angles for mirrors 19, 20 are such as to assure the reflections of light beam 15 from mirror 20 to mirror 18 and then to mirror 5 for reflection through lens 21 to photo-detector 16.

Now, the case where the hologram disk 7 and the rotary disk 18 are turned will be described.

First, the hologram disk 7 is for example rotated at 5,000 r.p.m. by the motor 17. Similarly, as in the above-described case, the light beam 2 provides parallel scanning lines (a raster pattern) the number of which is equal to the number of hologram lenses on the hologram disk 7, on the reading window 12.

Figure 3:
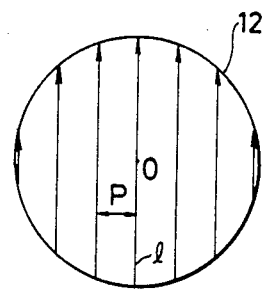
FIG. 3 is an explanatory diagram for describing the scanning pattern on a reading window when only the hologram disk is turned (with a rotary disk maintained stationary)
Figure 5:
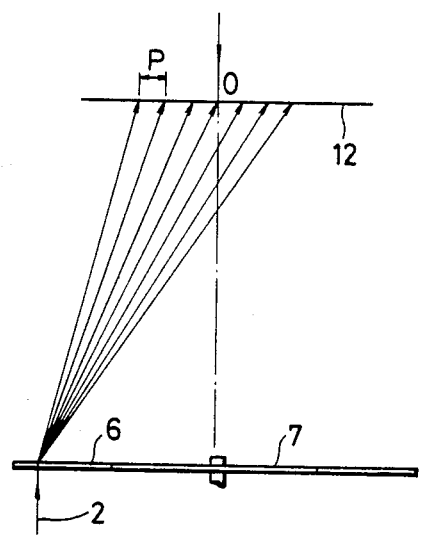
FIG. 5 is an explanatory diagram for describing an operation in which a light beam is deflected when passing through hologram lenses on the hologram disk, thus forming a scanning beam which scans a predetermined region of the reading window; and, FIGS. 6 and 7 are explanatory diagrams showing scanning patterns obtained by shifting scanning lines on the reading window by P/4 (where P is the scanning beam pitch). In the case of FIG. 6, only the hologram disk is turned, and the rotary disk is set in two positions, 180° our of phase with each other. In the case of FIG. 7, both the hologram disk and the rotary disk are turned.

FIG. 5 illustrates the light beam 2 which is deflected by rotation of the hologram disk 7 to scan a predetermined region of the reading window 12. FIG. 3 shows the scanning pattern on the reading window. In FIG. 3, reference character P designates a scanning line pitch, and l, the center scanning line in the pattern.

Figure 4:
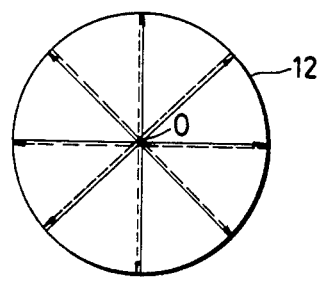
FIG. 4 is an explanatory diagram for describing the scanning pattern on the reading window when both the hologram disk and the rotary disk are turned.

Next, the hologram disk 7 is turned in one direction and simultaneously the rotary disk 18 is turned in the opposite direction through the belt 24 by the motor 23 at a speed much lower than the speed of the hologram disk 7 (for instance at 300 r.p.m.). As a result, the light beam 2 incident to the hologram disk 7 is turned through 360° by means of the first and second mirrors 19 and 20, and the light beam incidence point (or the point A) on the hologram disk 7 is moved along the circumference of the disk 7. As the direction of the above-described scanning line is parallel to the direction of a tangential line at the light beam incidence point on the hologram disk 7, the entire raster scanning pattern is turned through 360° by the rotation of the light beam, as shown in FIG. 4. FIG. 4 shows only the central scanning lines for convenience. However, it should be noted that, in practice, there are a number of scanning lines parallel with the central scanning lines. The number of scanning line directions included in the scanning pattern thus obtained can be substantially determined from the ratio of the speed of the hologram disk 7 to the speed of the rotary disk 18 (for instance 5000/300 ≃ 17).

Thus, laser beam scanning can be achieved in a number of directions without decreasing the number of scanning lines, that is, a bar code can be read in any orientation.

Figure 6:
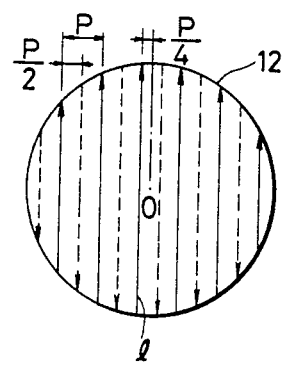

If, as shown in FIG. 6, the scanning lines on the reading window 12 are provided at positions displaced from the center by P/4 and in parallel (as indicated by the solid lines) when only the hologram disk 7 is turned, the scanning lines can be shifted to positions indicated by the broken lines when the rotary disk 18 is turned through 180°.

Figure 7:
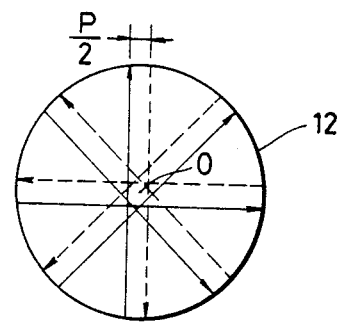

The rotation of the scanning lines with the rotation of the rotary disk 18 can be understood from FIG. 7 which shows only one scanning line, by way of example.

As is apparent from the above description, the number of scanning lines per unitary area on the readng window 12 can be doubled, and the capability of reading a bar code in all directions can be improved according to the invention.

In the above-described example, the light beam is applied perpendicular to the hologram disk by means of first and second mirrors integral with the rotary disk. However, the hologram scanner may be modified so that the light beam reflected from the first mirror is applied directly to the hologram disk at a certain angle, or is introduced to the hologram disk through a medium such as an optical fiber.

In the above-described hologram scanner, the speed of the hologram disk is higher than the rotary disk; however, the hologram scanner may be modified so that the former is slower than the latter.

Furthermore, in the above-described hologram scanner, the hologram disk and the rotary disk are turned in opposite directions; however, they may be turned in the same direction if the speeds thereof are much different from each other.

As is clear from the above description, in the hologram scanner according to the invention, the light beam irradiation regions are successively shifted by means for guiding light beams, so that the light beam is applied successively to the hologram lenses on the hologram disk, which is turned. Therefore, there can be readily achieved a scanning pattern having a number of scanning lines in many directions, making it possible to read a bar code in all directions with high accuracy, and to read a bar code of small height.

What is claimed is:
1. A hologram scanner, comprising;
   a hologram disk including a plurality of hologram lenses arranged circumferentially thereon;

means for rotating said hologram disk;
rotating light beam guide means for successively shifting irradiation regions in a direction with respect to the direction of rotation of said hologram disk, to successively apply a light beam to said hologram lenses on said hologram disk, said rotating light beam guide means having a rotational speed different from the rotational speed of said hologram disk and a rotational direction opposite to that of said light beam guide means; and
a reading window for reading an object to which said light beam is applied through said hologram lens;
wherein a radial raster pattern having parallel scan lines is defined having a number of scan lines equal to the number of hologram lenses.

2. A hologram scanner as claimed in claim 1, in which said light beam guide means comprises a rotary disk and means for turning said disk, and mirror means associated with said disk.

3. A hologram scanner as claimed in claim 2, said mirror means comprising a first mirror provided at the center of said rotary disk in a manner so as to turn together with said rotary disk; and a second mirror provided at a peripheral portion of said rotary disk, said light beam being introduced via said first and second mirrors to predetermined ones of said hologram lenses by rotation of said rotary disk.

4. A hologram scanner as claimed in claim 3, said first and second mirrors being fixed to said rotary disk in predetermined angular orientations.

5. A hologram scanner as claimed in claim 3, said rotary disk and said hologram disk rotating about the same rotary axis.

6. A hologram scanner, comprising;
a hologram disk including a plurality of hologram lenses arranged circumferentially thereon;
means for rotating said hologram disk;
rotating light beam guide means for successively shifting irradiation regions in a direction with respect to the direction of rotation of said hologram disk, to successively apply a light beam to said hologram lenses on said hologram disk, said rotating light beam guide means having a rotational speed different from the rotational speed of said hologram disk and a rotational direction opposite to that of said light beam guide means; and
a reading window for reading an object to which said light beam is applied through said hologram lens;
wherein a radial raster pattern having parallel scan lines is defined by a variable number of scanning line directions which are a function of the ratio rotation speed of the hologram disk to that of said light beam guide means.

7. A hologram scanner as claimed in claim 6, in which said light beam guide means comprises a rotary disk and means for turning said disk, and mirror means associated with said disk.

8. A hologram scanner as claimed in claim 7, said mirror means comprising a first mirror provided at the center of said rotary disk in a manner so as to turn together with said rotary disk; and a second mirror provided at a peripheral portion of said rotary disk, said light beam being introduced via said first and second mirrors to predetermined ones of said hologram lenses by rotation of said rotary disk.

9. A hologram scanner as claimed in claim 8, said first and second mirrors being fixed to said rotary disk in predetermined angular orientations.

10. A hologram scanner as claimed in claim 8, said rotary disk and said hologram disk rotating about the same rotary axis.

* * * * *